United States Patent Office 3,053,626
Patented Sept. 11, 1962

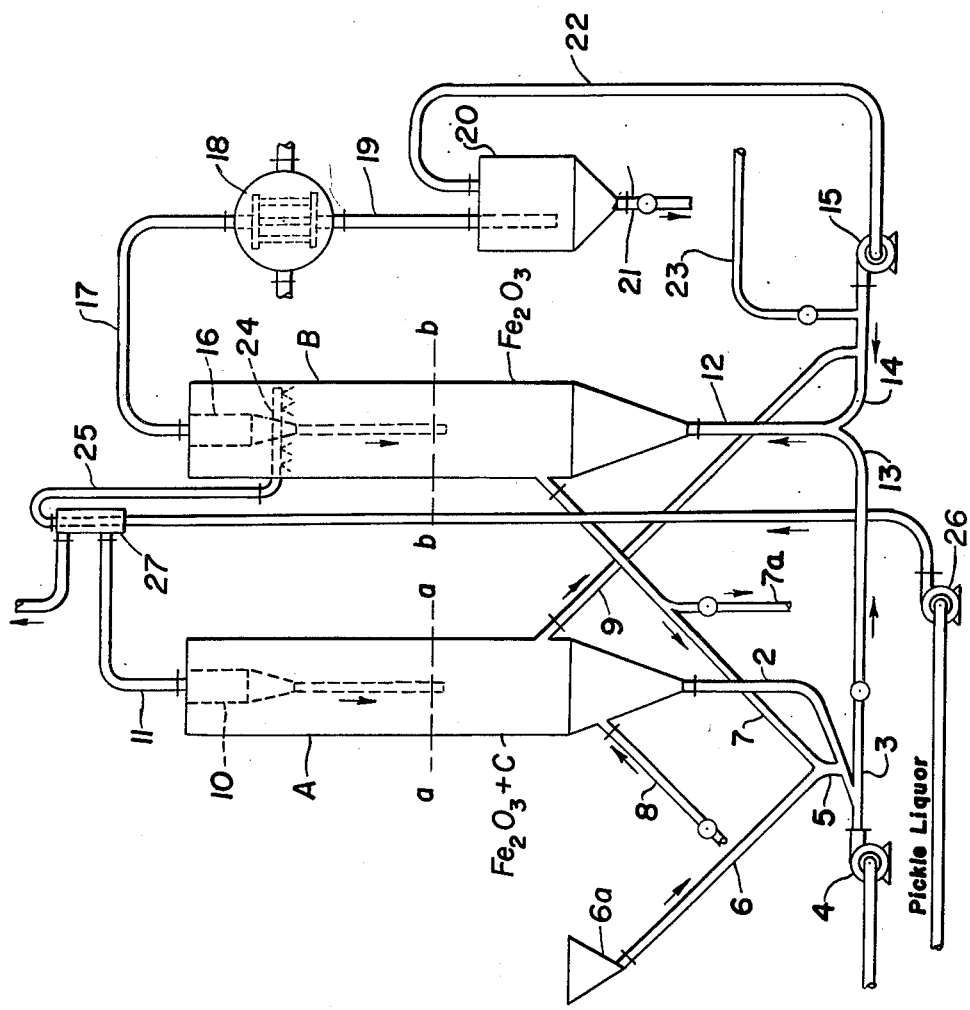
INVENTOR.
John A. Patterson

3,053,626
DECOMPOSITION OF HEAVY METAL SULFATE SOLUTIONS WITH THE RECOVERY OF SULFUR DIOXIDE AND THE HEAVY METAL OXIDE
John A. Patterson, McMurray, Pa., assignor to Chempro, Incorporated, Pittsburgh, Pa., a corporation of Pennsylvania
Filed May 8, 1959, Ser. No. 811,977
8 Claims. (Cl. 23—177)

This invention relates to the treatment of solutions of heavy metal sulphates for the production of sulphur dioxide in a useful concentration and an end product in the form of oxide of the heavy metal, or a mixture of said oxide with reduced particles of the heavy metal.

The process is especially applicable and useful for the treatment of pickle liquors resulting from the acid cleaning or pickling of ferrous metal where the liquor is principally a solution of ferrous sulphate, but is also applicable to the processing of ferrous sulphate liquors resulting from other operations, such as that obtained in the separation of titanium and iron by the use of sulphuric acid. Where industrial conditions may require such procedure, it may also be used for the treatment of sulphate solutions of other heavy metals, including aluminum, copper, nickel, uranium, etc., as distinguished from the alkali metals, alkaline earth metals, or metals which produce insoluble sulphate. For the purposes of this invention, I shall hereinafter specifically describe the process as applied to pickle liquor from the steel industry or similar ferrous sulphate solutions.

It has heretofore been proposed to treat pickle liquor by evaporating the solution to crystallize out ferrous sulphate monohydrate, separate the crystals from the mother liquor, and roast the ferrous sulphate to produce iron oxide and a gas containing sulphur dioxide in a concentration sufficient for use in the manufacture of sulphuric acid. This requires extensive equipment, and the steps of evaporation, crystallization and crystal separation are expensive steps in the procedure.

Attempts have heretofore been made to reduce the process to a one-stage procedure through the combining of evaporation and roasting, but the procedures heretofore developed produce a gas too low in sulphur dioxide, or too diluted with other gas for use as feed to a sulphuric acid plant.

The present invention has for its object to provide a process in which evaporation and roasting takes place in a single stage utilizing a fluidized bed system and secure sulphur dioxide in a useful concentration.

My invention may be more fully understood by reference to the accompanying drawing which is a schematic diagram of an apparatus for effecting the process.

In the drawing A is a reactor in the form of a vertically elongated cylindrical vessel having a conical bottom into which leads a pipe 2. This pipe connects with a duct 3 leading from an air blower 4. A duct 5 leads into the pipe 3, and two pipes 6 and 7 lead into this duct. The vessel A has a second pipe 8 leading into the bottom thereof through which start-up gas is introduced into the reactor. Leading from the vessel above the bottom is a discharge duct 9. A cyclone dust separator 10 is here shown as contained within the top of the vessel, and it discharges flue gases into an offtake pipe 11 while the dust is returned to the lower part of the vessel.

There is a second similar vessel B having a pipe 12 leading into the bottom thereof, which divides into two branches, one of which, 13, connects to pipe 3 leading from the blower 4. The other branch 14 leads to the discharge side of a second blower 15. The pipe 7 leads from the vessel B above its conical bottom, and it has a pipe 7a branching off from it.

The vessel B also is indicated as having an internal cyclone type dust collector 16 from which leads an offtake pipe 17, while the dust is returned to the lower part of the vessel B. Pipe 17 in turn leads to a condenser 18 which has a discharge pipe 19 leading into a condensate collector 20 which has a drain pipe 21 leading therefrom, and which also has a gas offtake pipe 22. Pipe 22 is connected to the intake side of blower 15. Pipe 14 has a branch pipe 23 leading therefrom. Pipe 9 leads into pipe 14 between pipe 23 and pipe 12.

There is a spray nozzle 24 in the upper part of vessel B which is supplied with the liquor to be processed through pipe 25, there being a pump 26 for forcing the liquid into the nozzle from a source of supply (not shown). There is here shown a heat exchanger 27 whereby flue gases carried off by pipe 11 may preheat the liquor flowing through pipe 25 to the spray nozzle 24.

With this description of the apparatus shown in the diagram, the process may now be explained. It may be assumed that the process has been started up and is operating according to its established cycle. Finely-divided solid fuel, such as coke or coal from a supply hopper 6a flows through pipe 6 and mixes with iron oxide being discharged through pipe 7, so that solid fuel and iron oxide enter pipe 2 and the mixture is carried by the air in pipe 2 into the vessel A. The air keeps the mixture of iron oxide and coke in the bottom of the vessel A fluidized. The vessel is filled to a level above the conical bottom and above discharge duct 9, line $a$—$a$ indicating the approximate top of the bed. The fuel is continuously burned, the start-up gas supply pipe 8 facilitating the initial starting up of the burning process. The combustion of the solid fuel heats the iron oxide in the fluidized bed and the hot oxide with a small amount of fuel passes out pipe 9. This oxide is picked up by $SO_2$ gas in pipe 14 and carried into the bottom of vessel B where the $SO_2$ gas fluidizes a bed of hot oxide. This bed extends above the offtake pipe 7, the level of the bed being indicated by line $b$—$b$.

The pickle liquor or metal sulphate solution, either concentrated or raw, sprays down through the hot atmosphere from the spray nozzles 24, giving up water as it passes through the hot gas above the fluidized bed. The residue falls onto the hot fluidized bed where the hot oxide disassociates the iron sulphate according to the reaction

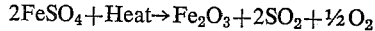

but since there is also some carbon present to combine with the oxygen the reaction may be expressed

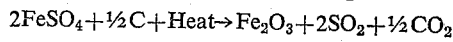

The iron oxide is continuously withdrawn through pipe 7, part of it passing out pipe 7a as product, and part being recycled to the fluidized bed in vessel A.

The $SO_2$ gas with water vapor and the small amount of $CO_2$ is led through pipe 17 and the water vapor is condensed in condenser 18. In vessel 20 the water and $SO_2$ are separated and the gas passes out pipe 22 to pump 15. Some of the $SO_2$ is led off through pipe 23 as feed for a sulphuric acid plant, and some of it is cycled, as explained above, into the vessel B as a fluidizing medium. For the processing of iron sulphate the temperature reached in vessel A is around 2000° F. and the maximum temperature in the bed in vessel B is about 1400° to 1600° F. The supply of air to vessel A required for fluidizing the bed insures an oxidizing atmosphere in this vessel to preclude reduction of the iron oxide to metal.

It is of course important that with iron sulphate or any other metal sulphate the temperature should be kept at a point below that at which sintering or fusing of any oxide or metal particles that may be reduced from said oxide would occur. In the processing of copper-sulphate solution, for example, the temperatures would be lower and some oxide might be reduced to metallic copper. The oxide used in any case is the oxide resulting from the breakdown of the metal salt in solution, and once it is formed its use in the cycle is simply that of a flowable heat transfer medium, while the part withdrawn as product may be used as a source of recoverable metal or any other purpose to which the respective oxides are adapted.

Temperatures may be controlled by controlling the rate at which fuel is consumed in unit A, the amount of air used in said unit, and by protecting the oxide in transit from A to B against loss of heat or exposing it to loss of heat. Also heat may be added to the $SO_2$ gas in a heat exchanger before it enters unit B, and other control measures apparent to those skilled in the art may be used. Also, while I have here shown the hot gases from unit A as being used to preheat the solution entering unit B, it can also or alternatively be used for evaporating water from the solution in advance of the apparatus here shown. If it is so used, the heat is nevertheless utilized in the process for readying the solution for spraying onto the hot oxide, since the more water extracted from the raw liquor, the less is the heat demand in unit B where any water must be evaporated.

The $CO_2$ gas is withdrawn from the system along with the $SO_2$, so that it never reaches a high concentration, and fuel ash is removed in proportion to and along with the removal of iron oxide as product, so that it never becomes over-concentrated. The process is a continuous one, and except for the pumps, requires little in the way of moving parts.

Also, if desired, and to eliminate a nuisance, the water discharged from vessel 20, being saturated with $SO_2$ may be run through a conventional steam stripping column and the $SO_2$ and steam discharged back into the condenser. This has not been shown since the apparatus is well-known, and if used is incidental to the main purposes of my invention.

The individual components of the apparatus herein described are all well-known equipment, and various modifications and changes may be made therein within the contemplation of my invention.

I claim:

1. The method of processing a solution of heavy metal sulphate to produce the oxide of the metal in the sulphate and sulphur dioxide which comprises continuously heating a finely-divided mass of metal oxide the same as that to be recovered from the sulphate solution in a closed environment by introducing into the mass of finely-divided oxide fuel and combustion air, burning the fuel in contact with the oxide while also utilizing the air to fluidize the mass of oxide and distribute the fuel therethrough, removing the gaseous products of combustion from the closed environment, continuously transferring, substantially free of gaseous combustion products, metal oxide so heated to a closed second environment, spraying the sulphate solution into said closed second environment above the heated oxide therein whereby water may be removed therefrom in the atmosphere above said oxide and the concentrated sulphate descends upon the heated oxide, the oxide in said second environment being maintained by the continuous transfer of heated oxide thereto from the first environment at a temperature where the sulphate is disassociated into the oxide of the metal and hot sulphur dioxide gas, removing the sulphur dioxide gas from the top of said second environment whereby it flows countercurrent to the solution which is sprayed into said environment, continuously withdrawing part of the oxide from said second environment and transferring part of it to the first environment to be heated and recycled without the gaseous combustion products to the second environment removing part of the oxide so withdrawn as end product, and simultaneously recirculating some of the sulphur dioxide removed from the second environment through the hot oxide in said second environment to fluidize the same and removing part of the sulphur dioxide as an end product, the oxide so transferred from one environment to the other being substantially chemically unchanged by any reaction in either environment.

2. The method of processing an aqueous solution of heavy metal sulphate to produce the oxide of the metal in the sulphate and sulphur dioxide which comprises maintaining within a closed environment a bed of metal oxide the same as that to be recovered from the sulphate solution, continuously supplying finely-divided solid fuel to said bed, continuously fluidizing said bed with combustion air supplied thereto and burning some of the solid fuel in the bed to heat the oxide, continuously withdrawing the gaseous combustion products from the closed environment, continuously transferring, substantially free of gaseous combustion products, heated metal oxide from the first bed to a second bed in a second separate closed environment to maintain said second bed in a heated condition, spraying a sulphate solution into the said second closed environment above the bed of heated oxide whereby water may be removed from the solution in the atmosphere above said heated oxide and the concentrated sulphate may descend upon the heated oxide, the oxide being maintained by the continuous supply of hot oxide from the first environment at a temperature where the sulphate is disassociated into the oxide of the metal and hot sulphur dioxide gas, part of the solid fuel from the first bed being also continuously transferred with heated metal oxide to the second bed to combine with free oxygen in the second environment, continuously withdrawing oxide from said second environment and transferring part of it to the first to be heated and recycled without the gaseous combustion products to the second, removing part of the oxide so withdrawn as end product, simultaneously recirculating sulphur dioxide removed from the second environment through said second oxide bed to fluidize the same, the oxide so transferred from one environment to the other being substantially chemically unchanged by any reaction in either environment.

3. The method of processing a solution of heavy metal sulphate as defined in claim 2 wherein any water vapor withdrawn along with sulphur dioxide from the second environment is condensed before the sulphur dioxide is recirculated through the second bed.

4. The method of processing a solution of heavy metal sulphate as defined in claim 2 wherein water vapor is removed from the second environment along with sulphur dioxide and the vapor condensed before the sulphur dioxide is recirculated through the second bed, part only of the sulphur dioxide so formed being continuously removed as an end product and wherein products of combustion resulting from the oxidation of the solid fuel in the first bed are withdrawn from the first environment and utilized to preheat the sulphate solution before it is sprayed into said second environment.

5. The method of processing a solution of heavy metal sulphate as defined in claim 2 wherein the combustion air supplied to the first environment is utilized to carry solid fuel into the first bed.

6. The method of processing a solution of heavy metal sulphate as defined in claim 2 wherein the combustion air supplied to fluidize the first bed is also used to carry finely-divided solid fuel and oxide withdrawn from the second bed to the first bed.

7. The method of processing a solution of heavy metal sulphate as defined in claim 2 in which sufficient air is supplied to the first bed to maintain a non-reducing atmosphere therein and a temperature of the order of 2000° F. and the oxide is transferred to the second bed at a rate sufficient to maintain the temperature of the second bed between about 1400° F. and 1600° F.

8. The method of processing a solution of heavy metal sulphate to produce sulphur dioxide and the oxide of the metal in the sulphate comprising continuously heating, using a fuel yielding gaseous combustion products, a finely-divided mass of metal oxide the same as that to be recovered from the sulphate solution in an oxide heating environment, continuously transferring to a closed second environment metal oxide so heated, the metal oxide being transferred substantially free of gaseous combustion products, spraying the sulphate solution into said closed second environment onto the heated oxide therein, the oxide in said second environment being maintained by the constant transfer of heated oxide from the heating environment at a temperature wherein the sulphate is disassociated into the oxide of the metal and hot sulphur dioxide gas, removing the sulphur dioxide gas from the top of said closed second environment, continuously withdrawing some of the oxide from said second environment and transferring part of it to the first environment to be heated and recycled substantially free of gaseous combustion products to the second environment and removing part of the oxide so withdrawn as the end product, while simultaneously recirculating some of the sulphur dioxide removed from the second environment through the hot oxide in said second environment to agitate the hot oxide, the oxide so transferred from one environment to the other being substantially chemically unchanged by any reaction in either environment.

References Cited in the file of this patent

UNITED STATES PATENTS

| | | |
|---|---|---|
| 1,048,247 | Weeks | Dec. 24, 1912 |
| 1,348,462 | Weaver | Aug. 3, 1920 |
| 1,813,649 | Weise | July 7, 1931 |
| 2,452,517 | Broughton | Oct. 26, 1948 |
| 2,625,464 | Roberts et al. | Jan. 13, 1953 |
| 2,766,102 | Lewis et al. | Oct. 9, 1956 |
| 2,783,141 | Foley | Feb. 26, 1957 |
| 2,813,016 | Thornhill | Nov. 12, 1957 |
| 2,867,506 | Roberts | Jan. 6, 1959 |